United States Patent
Oosterling et al.

(10) Patent No.: US 6,498,338 B2
(45) Date of Patent: Dec. 24, 2002

(54) DEVICE AND METHOD FOR AUTOMATICALLY MILKING COWS

(75) Inventors: Pieter Adriaan Oosterling, CP Nieuw-Vennep (NL); Jacobus Petrus Maria Dessing, La Cruquius (NL)

(73) Assignee: Prolion B.V., Vifthuizen (NL)

( * ) Notice: Subject to any disclaimer, the term of this patent is extended or adjusted under 35 U.S.C. 154(b) by 0 days.

(21) Appl. No.: 09/766,705

(22) Filed: Jan. 22, 2001

(65) Prior Publication Data

US 2001/0017346 A1 Aug. 30, 2001

Related U.S. Application Data

(63) Continuation of application No. PCT/NL99/00435, filed on Jul. 8, 1999.

(30) Foreign Application Priority Data

Jul. 22, 1998 (NL) .............................................. 1009711

(51) Int. Cl.[7] ................................................ G01V 9/04
(52) U.S. Cl. .................................... 250/221; 119/14.02
(58) Field of Search .............................. 250/221, 221.1; 119/14.02, 14.08, 604

(56) References Cited

U.S. PATENT DOCUMENTS 4,868,901 A  9/1989  Kniskern et al. ......... 250/222.2

FOREIGN PATENT DOCUMENTS

| DE | 195 23 676 A1 | | 7/1995 |
| EP | 213 660 A1 | | 7/1986 |
| EP | 455305 A1 | | 5/1991 |
| EP | 777961 A1 | | 12/1996 |
| EP | 0777961 A1 | * | 11/1997 |
| EP | WO-99/09430 | * | 2/1999 |
| JP | 409275834 A | * | 10/1997 |

* cited by examiner

Primary Examiner—Stephone Allen
(74) Attorney, Agent, or Firm—St. Onge Steward Johnston & Reens LLC

(57) ABSTRACT

The invention relates to a sensor device for use, for example, in an automatic milking device and, in particular, for detecting the positions of the teats of an animal which is to be milked. The sensor device comprises a number of radiation sources which generate non-divergent radiation beams which have different positions and/or directions which are known in the control unit. The reflections from the irradiated object are detected using detectors, and there are means for distinguishing between the reflections from the various radiation sources, so that the control unit is able to establish the position of the object.

13 Claims, 3 Drawing Sheets

Figure 1:
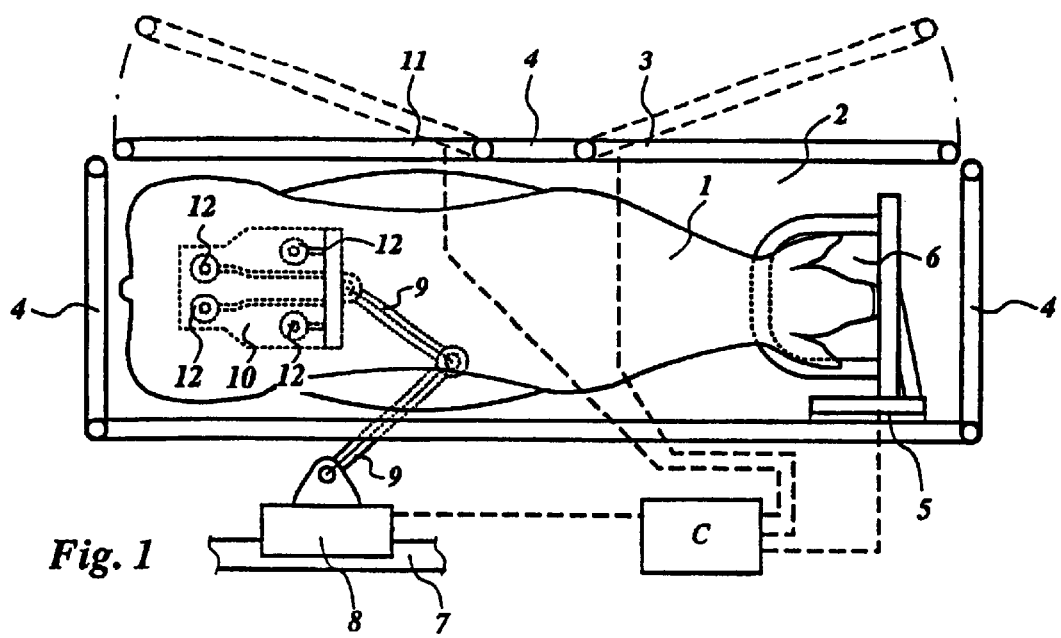

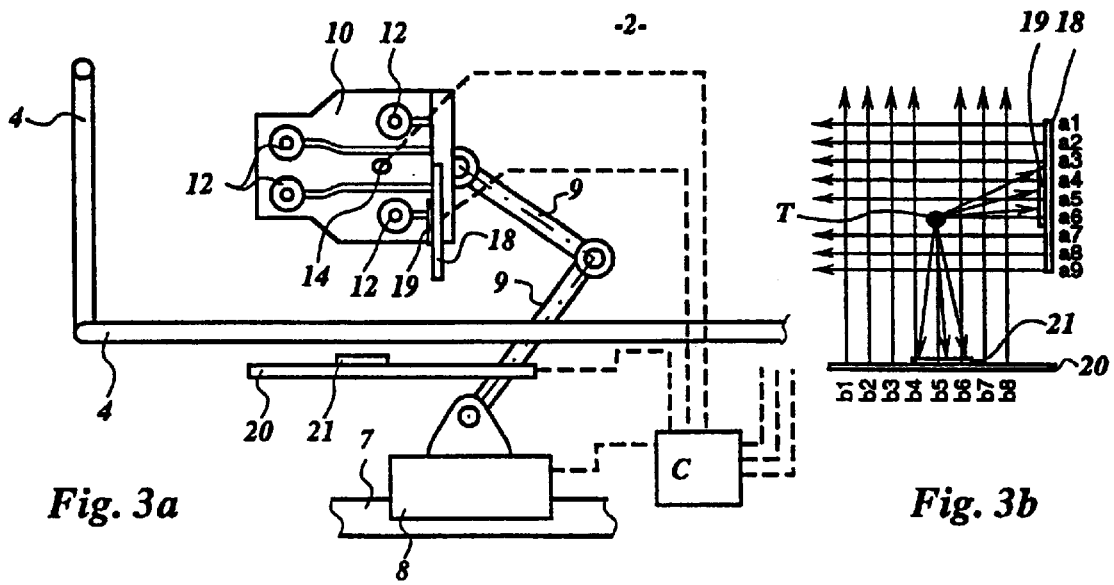
Fig. 3a  Fig. 3b
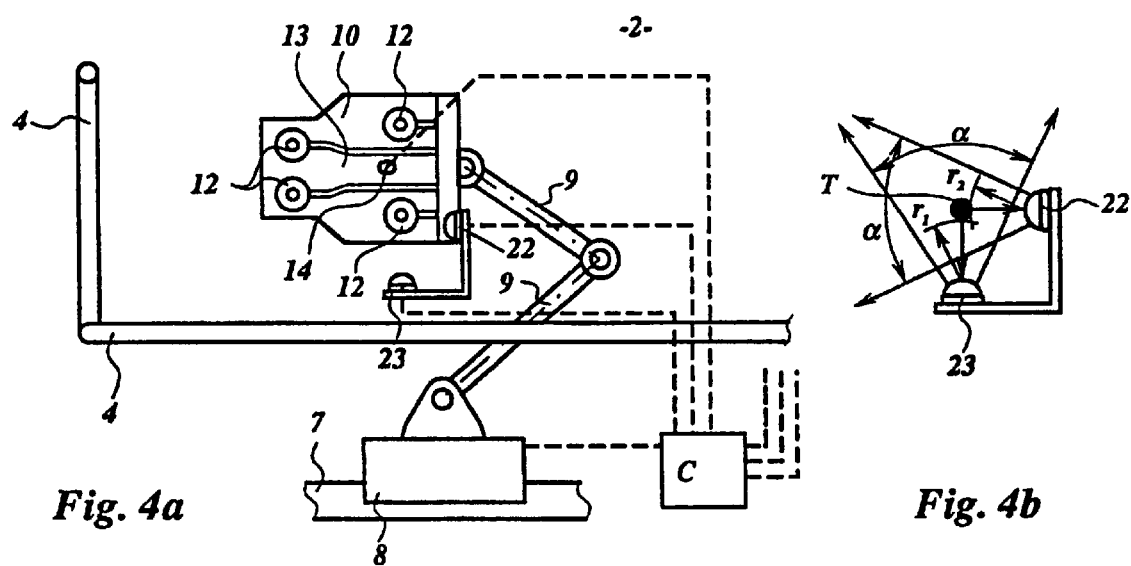
Fig. 4a  Fig. 4b

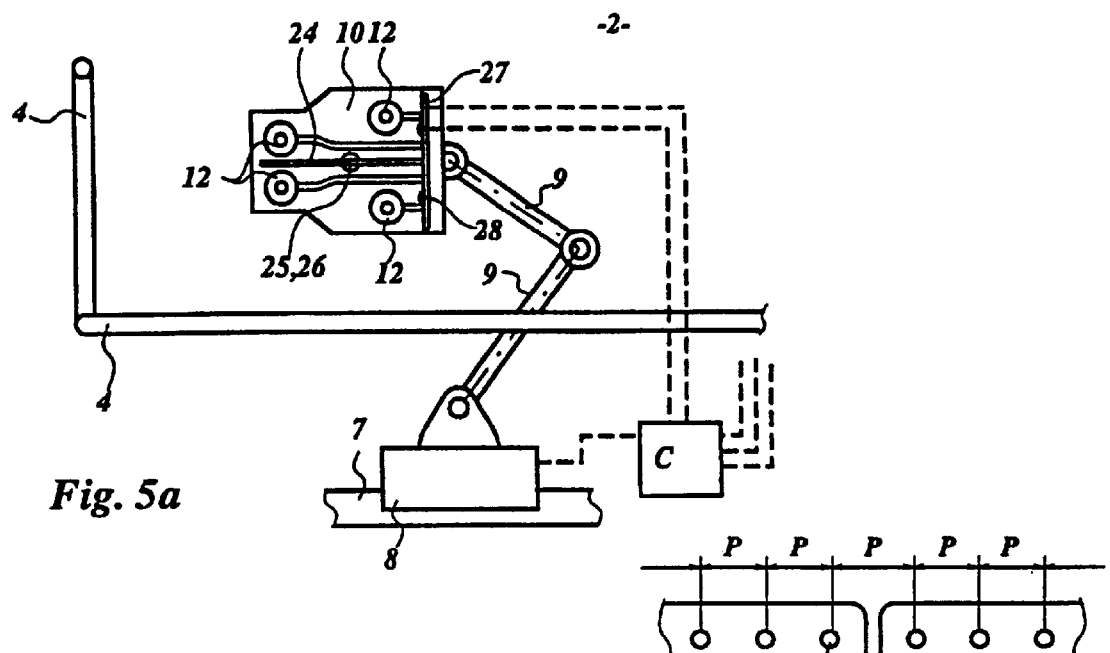
Fig. 5a
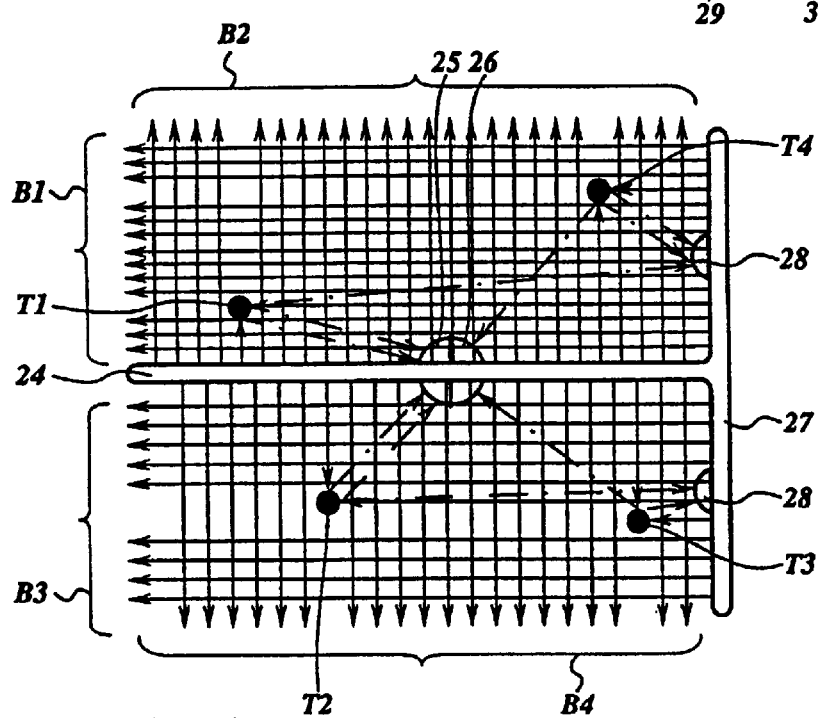
Fig. 5b
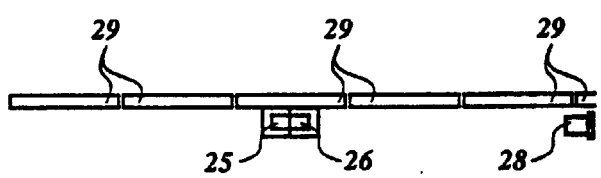
Fig. 5c
Fig. 5d

DEVICE AND METHOD FOR AUTOMATICALLY MILKING COWS

This is a continuation of pending International Application PCT/NL99/00435 filed Jul. 8, 1999, which designates the United States.

The invention relates to a sensor device according to the preamble of Claim 1. A sensor device of this nature is known from EP 0,455,305, which shows a sensor which can rotate about a vertical axis and which generates horizontally directed laser beams which, by means of the rotation of the sensor, cover the horizontal plane. The position of the object to be detected is determined by recording the direction of the laser beam and the distance from the object to the sensor in the control unit. The drawback of the known device is that the position of the object is highly dependent on the direction of the laser beam, which therefore has to be determined with a high level of accuracy, and this is difficult to achieve. Also, the means of measuring the distance between the sensor and the object are relatively expensive. The object of the invention is to eliminate the abovementioned drawbacks, and to this end the sensor device is designed in accordance with the characterizing part of Claim 1. In this way, the sensor device is provided with simple radiation sources and detectors for determining the position of the object reliably and inexpensively.

According to a refinement, the sensor device is designed according to the characterizing part of Claim 2. This makes it easy to distinguish between the various radiation sources.

According to one embodiment, the sensor device is designed according to Claim 3. This provides a further distinction between the various radiation sources, with the result that if appropriate it is also possible for a plurality of sources to be activated simultaneously.

According to one embodiment, the sensor device is designed according to Claim 4. In this way, the position of the object can be established with greater accuracy.

According to one improved embodiment, the sensor device is designed according to Claim 5. In this way, it is simple to detect two or more objects in the operating area.

According to a further refinement, the sensor device is designed according to Claim 6. Positioning the radiation sources next to one another in a sensor unit makes them easy to position with accuracy.

According to a further refinement, the sensor device is designed according to Claim 7. This makes activation and switching of the radiation sources easier and avoids thick cables with many different cores leading from the control unit to the radiation sources.

The invention also comprises a milking device according to the preamble of Claim 8. A milking device of this nature is known from the document referred to above. Using the abovementioned sensor device in accordance with the characterizing part of Claim 6 results in an accurate and operationally reliable device.

According to one embodiment, the milking device is designed according to Claim 9. In this way, the teats can be located in a simple manner.

According to one embodiment, the milking device is designed according to the characterizing part of Claim 10. In this way, it is simple to detect the position of all the teats of the udder simultaneously.

The invention also comprises a sensor unit according to Claim 11. A sensor unit of this nature is compact and easy to install, and it is possible to generate a large detection field without the need for a large signal cable leading to the sensor unit.

Figure 2A:
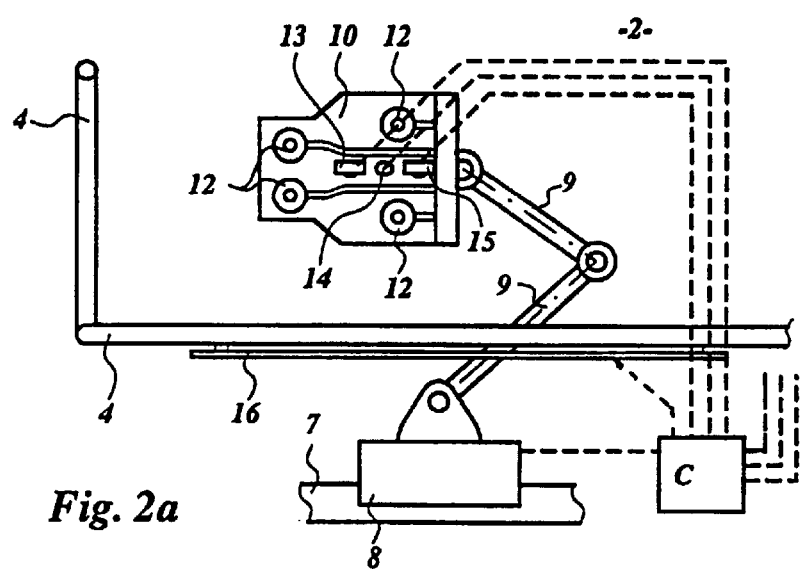
Figure 2B:
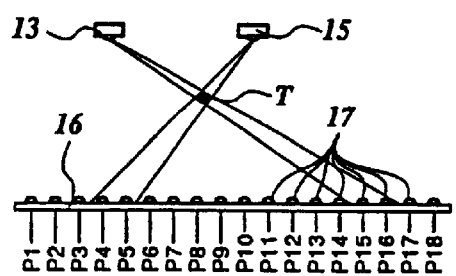

The invention will be explained below with reference to a drawing showing a number of exemplary embodiments, in which:

FIG. 1 shows a diagrammatic plan view of a milking stall with an automatic milking device, FIG. 2a shows a diagrammatic plan view of a first embodiment of a sensor system as used in FIG. 1, FIG. 2b diagrammatically shows how the sensor system shown in FIG. 2a operated, FIG. 3a shows a diagrammatic plan view of a second embodiment of a sensor system as used in FIG. 1, FIG. 3b diagrammatically shows how the sensor system shown in FIG. 3a operates, FIG. 4a shows a diagrammatic plan view of a third embodiment of a sensor system as used in FIG. 1, FIG. 4b diagrammatically shows how the sensor system shown in FIG. 4a operates, FIG. 5a shows a diagrammatic plan view of a fourth embodiment of a sensor system as used in FIG. 1, FIG. 5b diagrammatically shows how the sensor system shown in FIG. 5a operates, FIG. 5c shows a diagrammatic side view of the sensor system of FIG. 5a, FIG. 5d shows a detailed view of the sensor unit of the sensor system of FIG. 5a.

Wherever possible, the various figures use identical reference numerals for identical components.

FIG. 1 shows a milking stall 2 which is surrounded on three sides by a fixed fence 4 and on the fourth side has an entry gate 11 and an exit gate 3, which are attached to a fixed fence 4. In the milking stall 2, there is a feed trough 6 which, by means of a slide mechanism 5, can be displaced in the longitudinal direction of the milking stall 2 and by mean of which the length of the milking stall 2 is adapted in a known way to the length of an animal which is to be milked, such as a cow 1. If appropriate, there may be identification means (not shown) for establishing the identify of cow 1. The cow 1 can enter the milking stall 2 via the entry gate 11, where it can be milked. For this purpose, a milking rack 10 is moved beneath its udder and milking cups 12 are automatically attached to the teats of the udder. For this attachment of the milking cups 12 to the teats, use is made of a manipulator 8 which can be displaced along a rail 7 in the longitudinal direction of the milking stall 2. The milking rack 10 is attached to the manipulator 8 by means of manipulator arm 9. The milking cups 12 are connected in a known way to milking equipment (not shown). As is diagrammatically depicted, the various components of the installation are controlled by a control system C.

The milking stall 2 shown may be used on its own, or else there may be a plurality of milking stalls 2 positioned one behind the other. In this case, each milking stall 2 may have its own manipulator 8, as shown here, or else each milking stall 2 may, in a known way, have a milking rack 10 which can be moved by a common manipulator 8 which alternately attaches the milking cups 12 of the various milking racks 10 in the various milking stalls 2 to the teats of the udders of various cows.

FIGS. 2a and 2b show a first embodiment of a sensor system which measures the position of the teats, which position can be calculated with respect to the milking stall 2 or with respect to the milking rack 10. This is possible because the position of the milking cups 12 with respect to the milking stall 2 is known in the control unit C via encoders which are present in the manipulator 8. A first radiation-sensitive detector 13 and a second radiation-sensitive detector 15 are positioned on the centre axis of the milking rack 10. The direction of sensitivity of the detectors 13 and 15 is oriented towards the long side, remote from the entry gate 11, of the milking stall 2. On this long side, a light strip 16 is arranged outside the fixed fence 4, which light strip comprises a large number of infrared radiation sources 17 which are located at a short distance from one another, for example with a gap of from 5 to 8 mm between them. The radiation sources are designed in such a way that the time for which radiation is emitted may be extremely short. The radiation from the infrared sources 17 can be detected by the detectors 13 and 15.

This sensor system operates as follows. The radiation sources 17 are successively activated and then emit a divergent beam of infrared radiation for a short time. The first detector 13 and the second detector 15 establish which of the illuminating radiation sources 17 are visible. This is established for each radiation source 17 in the control system C. Preferably, the radiation sources 17, which may be designed as Light-Emitting Diodes, or LEDs, emit infrared light which is invisible to the cow which is to be milked. Other electromagnetic radiation is also possible.

In the situation depicted in FIG. 2b, the presence of a teat T means that the radiation sources p15 and p16 will not be detected by the first detector 13, and the radiation sources p4 and p5 will not be detected by the second detector 15. In the control unit C, the position of the detectors 13 and 15, via the position measurement by means of encoders in the manipulator 8, and the position of the radiation sources p1–p18 are known, so that the position of the teat T can be calculated. The time for which the radiation sources (LEDs) light up may be from a few microseconds to a few milliseconds. For a duration of 1 millisecond, a detection cycle using 100 radiation sources lasts from 0.1 to 0.2 sec. The detection frequency with which the position of the teat T can be established may then be 5–10 Hz, which is generally sufficient to follow the movements of the cow 1. If necessary, the duration of radiation per radiation source can be shortened further, so that the detection frequency can be increased without problems. In one embodiment, each LED emits a pulse sequence of 33 microseconds on, 33 microseconds off, 33 microseconds on and then off, with a subsequent LED starting 200 microseconds after the first LED has started. The LED is recognized as the radiation source as a result of the pulse sequence and is not confused with ambient sources.

Once the position of the teat T is known, a sensor 14 which is sensitive all the way round is positioned centrally beneath the udder, and the position of the teats with respect to one another is established in a known way, so that all the positions of the teats are known in the control unit C and the milking cups 12 can be attached in a known way.

In the exemplary embodiment shown, the two radiation-sensitive detectors 13 and 15 are mounted at a fixed position on the milking rack 10. It is also possible, instead of having two detectors 13 and 15, to use one detector which is moved alternately to two different positions, either by positioning a carriage on the milking rack 10 or by displacing the milking rack 10. In a preferred embodiment, the light strip 6 is vertically adjustable in a manner which is known, for example by being attached to a carriage and by coupling the vertical adjustment of the light strip 6 to that of the milking rack 10 and the manipulator 8, so that the detection field between the light strip 16 and the detectors 13 and 15 is always more or less horizontal.

FIGS. 3a and 3b show a second embodiment of a sensor system for detecting a teat T. The sensor system comprises a first light strip 18 which is mounted on the milking rack 10 and on which there are radiation sources which emit non-divergent beams of electromagnetic radiation towards the rear side of the animal which is to be milked. This radiation is generated, for example, in a laser source. The radiation sources may then be laser LEDs which emit infrared or visible light. The beams a1–a9 which are located next to one another in the horizontal plane are parallel to one another and perpendicular to the light strip 18. A first radiation-sensitive detector 19, which is able to detect radiation reflected from an object, is positioned beneath, above or in the vicinity of the light strip 18.

Along the side of the milking stall 2, there is a light strip 20 having, for example, laser light sources which are able to generate non-divergent, parallel beams of electromagnetic radiation b1–b8 which are located next to one another. In the vicinity of the light strip 20, there is a second radiation-sensitive detector 21. The laser beams which are fitted in the light strip 18 generate radiation beams a1–a9 which lie in a single plane and, in that plane, intersect the radiation beams b1–b8 which are generated by the laser sources in the light strip 20. For detection of the teat T, this detection plane is horizontal, as a result of the vertical movement of the light strip 20 being coupled to the vertical movement of the light strip 18.

By means of the control system C, the laser sources in the light strips 18 and 20 are activated successively. On activation of each laser source separately, the radiation-sensitive detectors 19 and 21 are used to check whether the radiation beam is reflected, and this is recorded in the memory of the control unit C. In the situation shown in FIG. 3b, the radiation beams a6 and b5 are reflected. Since the position and direction of the radiation beams is known in the control unit C, it is possible to calculate the position of the teat T. The time for which each radiation source emits radiation may be very short, for example a few tens of microseconds, so that it is possible to achieve a high detection frequency.

In the exemplary embodiment, the light strip 20 is positioned outside the fixed fence 4 of the milking stall 2. However, it is also possible for the light strip 20 to be mounted in a known way on the milking rack 10, resulting in a smaller detection field. The light strip 20 is attached to a carriage and is vertically adjustable, the height always being kept equal to that of the light strip 18, so that the radiation beams are always active in one detection plane. The height adjustment may be coupled to the height of the milking rack 10 mechanically or via an electronic control unit. A sensor 14 which is sensitive all the way around is attached to the milking rack 10, so that after the position of the teat T has been determined, the positions of all the teats can be established in the manner described above and the milking cups can be attached.

In the exemplary embodiment, the radiation sources act in succession and are distinguished from one another in this way as a result of this being recorded in the control unit C. This distinction can also be established differently, for example as a result of each radiation source emitting radiation with a characterizing code or frequency. The code may then comprise a pulse train of characterizing frequency or duration, and the radiation beam with this code is identified by the detectors as coming from a particular radiation source. Moreover, each radiation source may additionally also generate a code in order to distinguish the radiation from ambient radiation.

FIGS. 4a and 4b show a third embodiment of a sensor system for detecting a teat. A first sensor 22 and a second sensor 23 are arranged on the milking rack 10. Each sensor 22 or 23 emits a beam of laser radiation in a horizontal plane, which radiation covers a segment of a circle with an angle α. The common part of the circle segments is the detection area. In each sensor 22 and 23, there is a detector for detecting reflection of the radiation emitted by the sensor. There are also means for establishing the time which elapsed between transmission and reception of the radiation, for example by measuring the phase difference between the transmitted and received radiation. As a result, it is possible, using the sensors 22 or 23, to successively establish a distance r1 or r2, respectively, to the teat T, so that it is possible to calculate the position of the teat T. Then, with the aid of the sensor 14 which is sensitive all the way around, it is possible, in the way described above, to calculate the positions of the other teats as well.

In exemplary embodiments shown, milking rack 10 is moved by the manipulator 8, which is coupled thereto. The various sensors and detectors may in this case be attached to the milking rack 10 or the manipulator 8. If the manipulator 8 is able to operate more than one milking stall 2, the sensors and detectors are preferably attached to the manipulator 8.

In the exemplary embodiments shown, use is made of a first sensor system for detecting a teat T and a second sensor system with a sensor 14 which is sensitive all the way around for establishing the position of the teats with respect to one another. However, it is also possible, in particular with the sensor systems according to the first and second exemplary embodiments, to establish the positions of all four teats directly. For this purpose, it is possible, for example, to position two light strips at right angles to one another on the milking rack 10, if appropriate with detectors on both long sides and possibly also the rear side of the milking stall 2. It is also possible to arrange light strips along both long sides of the milking stall 2, in which case the detectors positioned on the milking rack 10 are able to detect all the way around.

One of these designs of the sensor system is shown in the fourth exemplary embodiment which is shown in FIGS. 5a and 5b. On the centre axis in the longitudinal direction of the milking rack 10, there is a central light strip 24 which is able to emit electromagnetic radiation, which is generated by radiation sources, in non-divergent radiation beams towards both sides of the milking stall 2, over the milking cups 12. On the front of the milking rack 10, a light strip 27 is arranged on both sides of the milking rack 10, the radiation from which light strip, generated by separate radiation sources, is directed towards the rear and which is able to emit non-divergent radiation beams over the milking cups 12.

In the centre of the milking rack 10, on each side of the central light strip 24, there is a detector 25 which is directed towards the rear and a detector 26 which is directed towards the front. A longitudinal detector 28 is arranged beneath each light strip 27. The light strips 24 and 27 and the detectors 25, 26 and 28 are connected to the control unit C.

FIG. 5b shows how the sensor system operates, it being possible to calculate the positions of the teats T1, T2, T3 and T4. The light strips 24 and 27 emit radiation beams B1, B2, B3 and B4 which lie in a single plane. The radiation is generated by radiation sources, such as for example laser LEDs, which successively emit narrow, non-divergent beams of electromagnetic radiation (such as for example infrared light). If a radiation beam comes into contact with a teat, the light is reflected from the teat. This reflection is detected by one or two of the detectors 25, 26 and 28. By analysis of these detections in the control unit C, it is possible to determine whether the detected reflection is from a front teat T3 or T4 or rear teat T1 or T2. Since the radiation source from which the reflected light emanates is known, it is possible for the position of the teats to be determined accurately. The radiation source from which the reflected radiation emanates can be determined in two ways, i.e. due to the fact that the radiation sources are activated successively and/or due to the fact that a radiation source emits coded radiation, for example by emitting a pulse train with characterizing properties. If appropriate, the radiation sources of the left-hand and the right-hand side of the milking rack 10 are considered separately. If this results in undesirable reflection, all radiation sources are identified separately.

FIGS. 5c and 5d show that the light strips 24 and 27 are composed of sensor units 29 which are each provided with laser LEDs 30 with a distance P between them. The distance P is, for example, 5–8 mm.

The way in which the exemplary embodiment shown operates is as follows. By means of the manipulator 8, the milking rack 10 is positioned beneath the belly of the cow 1. The light strips 27 and the detectors 28 are activated, and the position of the teats with respect to the milking rack 10 is established. After the centre axis of the milking rack 10 has been positioned centrally between the teats, the milking rack 10 is moved towards the rear. Then, the light strips 24 and the detectors 25 and 26 are activated, so that the positions of all the teats can be established in the manner described above. Then, the milking cups 12 are attached. For detection of the teats, it is important for the level of the teats to be established. This is achieved in a known way by moving the sensor system upwards and stopping this movement as soon as two or four teats are detected. This may be carried out both when the milking rack is being centred beneath the udder and, if necessary, again when the positions of all four teats are being detected.

In addition to the embodiment of the milking device shown, in which the milking cups 12 are supported on a milking rack 10 before they are positioned around the teats of the udder, it is also possible to use the sensors in a similar way in a device in which the milking cups 12, before they are attached, are stored in a rack positioned along the milking stall 2. The milking cups 12 are then taken out of the rack one by one by a manipulator and are attached to a teat. It is then possible, if appropriate, to attach a sensor system as described above, for example a system in which non-divergent radiation beams intersect one another in a detection plane, to the manipulator which attaches the milking cup 12 to the teat. This plane may be horizontal, as described in the context of the embodiments shown in FIGS. 3a and 3b and FIGS. 5a and 5b. The beams may also be positioned and directed in such a manner that, for example, a conical and upwardly directed detection plane with intersecting radiation beams is formed. This solution makes it possible to approach the udder from below when the milking cups 12 are being attached.

The dimensions of the detection plane are preferably selected in such a manner that if appropriate a plurality of teats can be detected simultaneously, so that it is possible to establish in the control unit C which of the teats is detected at a particular moment. In another embodiment, the position of the animal to be milked is detected in a known way, with the result that the general position of the teats is known in the control unit on the basis of the identity of the animal to be milked, and the sensor device is used for accurate positioning of a milking cup 12 around a teat.

If appropriate, the exemplary embodiments described above may be adapted by using components or structures from one embodiment in a different embodiment.

What is claimed is:

1. Sensor device for determining the position or the size of an object positioned in an operating area, comprising an array of radiation sources for generating in the operation area individually identifiable and stationary radiation beams which have known different positions and/or directions, a detector for detecting the reflection of a radiation beam on the object, and a control unit responsive to the detected reflection to calculate the position of the object after establishing the radiation source associated with a detected reflection.

2. Sensor device according to claim 1, and further comprising switching means for activating the radiation sources successively.

3. Sensor device according to claim 1, and further including means for generating characterizing radiation from said radiation sources with pulse trains of characterizing form.

4. Sensor device according to claim 1, wherein there are at least two stationary detectors for detecting reflections.

5. Sensor device according to claim 1, further comprising two or more interacting detectors positioned to cover different parts of the operating area.

6. Sensor device according to claim 1, wherein the stationary radiation sources are mounted in a line next to one another in sensor units, the radiation beams being generally parallel.

7. Sensor device according to claim 6, characterized in that each sensor unit comprises switching means for successively activating a radiation source mounted in a sensor unit.

8. A milking device according to claim 1, for automatically milking animals and comprising a milking stall, milking cups, and a manipulator for placing the milking cups around the teats of an udder of a cow, wherein said sensor device determines the position of the teats.

9. The milking device according to claim 8, characterized in that the radiation sources emit beams which intersect one another and lie in one plane, and with said beams, as a group, being moveable, although each of said beams being stationary with respect to one another, in a direction so as to move the plane with respect to the milking stall.

10. Milking device according to claim 8, in which the milking cups, before they are attached to the teats, are supported by a milking rack which is positionable beneath the udder, characterized in that said radiation sources are arranged about the center of the milking rack, and are directed towards sides of the milking stall and interact, inter alia, with detectors aligned to respectively cover different parts of an area above the milking rack.

11. The sensor device according to claim 1, wherein a number of radiation sources are positioned in a line next to one another, and wherein the radiation sources are successively activated by switching means for generating non-divergent, parallel radiation beams.

12. Sensor device for determining the position or the size of an object positioned in an operating area, comprising an array of stationary radiation sources for generating individually identifiable and stationary radiation beams which have known different positions and/or directions, at least two stationary detectors for detecting the radiation beams and positioned to detect the object when it intercepts a said radiation beam, and a control unit responsive to the detected radiation beams for identifying the detected radiation beams and to derive therefrom the position of the object.

13. Sensor device for determining the position or the size of an object positioned in an operating area, comprising an array of stationary radiation sources for generating individually identifiable and stationary radiation beams which have known different positions and/or directions, a detector for detecting the radiation beams and positioned to detect the object when it intercepts a said radiation beam, said detector lying in a plane and being translatable in any direction in the plane, the plane being generally parallel to a plane in which the object lies, and a control unit responsive to the detected radiation beams for identifying the detected radiation beams and to derive therefrom the position of the object.

* * * * *